United States Patent [19]

Adams et al.

[11] Patent Number: 5,175,817

[45] Date of Patent: Dec. 29, 1992

[54] DATA REPRESENTATION PROTOCOL FOR COMMUNICATIONS BETWEEN DIFFERENT NETWORKS

[75] Inventors: Samuel T. Adams, Windham; Mahendra J. Kaycee, Londonderry, both of N.H.; Michael J. Heffler, Plainsboro, N.J.

[73] Assignee: Digital Equipment Corporation, Maynard, Mass.

[21] Appl. No.: 439,239

[22] Filed: Nov. 20, 1989

[51] Int. Cl.⁵ .................. G06F 13/38; G06F 15/16; G06F 5/00

[52] U.S. Cl. .................. 395/200; 395/500; 364/DIG. 1; 364/228; 364/240.8; 364/242.94; 364/242.95; 364/284; 364/284.4

[58] Field of Search ............. 364/200, 900; 395/200, 395/500

[56] References Cited

U.S. PATENT DOCUMENTS

| | | | |
|---|---|---|---|
| 4,475,192 | 10/1984 | Fernow et al. | |
| 4,493,021 | 1/1985 | Agrawal et al. | 364/200 |
| 4,494,194 | 1/1985 | Harris et al. | 395/275 |
| 4,511,958 | 4/1985 | Funk | 364/200 |
| 4,554,659 | 11/1985 | Blood et al. | 370/88 |
| 4,631,666 | 12/1986 | Harris et al. | 395/425 |
| 4,644,547 | 2/1987 | Vercelloti et al. | 371/69 |
| 4,791,566 | 12/1988 | Sudama et al. | |
| 4,800,488 | 1/1989 | Agrawal et al. | |
| 4,814,980 | 3/1989 | Peterson et al. | 364/200 |
| 4,823,122 | 4/1989 | Mann et al. | |
| 4,868,742 | 9/1989 | Gant et al. | 364/200 |
| 4,873,626 | 10/1989 | Gifford | 364/200 |

FOREIGN PATENT DOCUMENTS 0167725  1/1986  European Pat. Off.

OTHER PUBLICATIONS

F. Halsall, "Data Communications, Computer Networks and OSI", Addison-Wesley Co., 1988.

*Primary Examiner*—Kevin A. Kriess
*Attorney, Agent, or Firm*—Kenyon & Kenyon

[57] ABSTRACT

A data representation and protocol are provided to interface two networks. A plurality of information units to be transmitted from one network to another are formatted into a variable size block in accordance with the protocol. Each block contains a header field storing a total information unit count and a control information unit count. The remainder of the block stores the actual information itself, both control and data, in consecutive byte locations, with the actual control information located at the end of the block. The block can then be sent to another network for processing. A device in the other network need only reference the block header to determine whether the information contained in the block is control or data. This speeds the processing of large quantities of either all data information and/or control information.

16 Claims, 2 Drawing Sheets

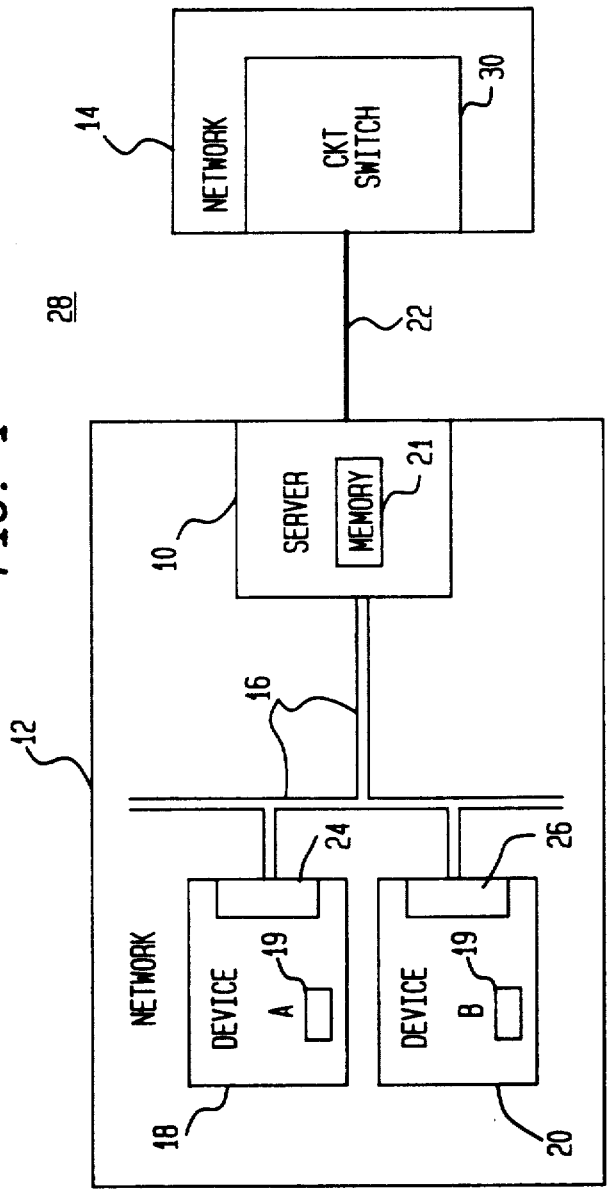

FIG. 3

| | 0 | 10 | 13 | 16,15 | | | 31 |
|---|---|---|---|---|---|---|---|
| | CHANNEL NUMBER (71) | BYTE 2 | CNTRL CNT (72) | BYTE 1 | | | TOTAL COUNT (70) |
| 01 | | | | | | | |
| 02 | | | | | | | |
| 03 | | | | | | | |
| 04 | | | | | | | |
| 05 | | | | | | | |
| ... | | | | | | | |
| 257 | | | | | | | BYTE 1023 |

| | 0 | 10 | 13 | 16,15 | 31 |
|---|---|---|---|---|---|
| | CHANNEL NUMBER (71) | | CNTRL CNT = 3 (72) | | TOTAL COUNT = 10 (70) |
| 01 | D1 | | D2 | | D3 | D4 |
| 02 | D5 | | D6 | | D7 | C1 |
| 03 | C2 | | C3 | | X | X |
| 04 | | | | | | |

{ 50 }

DATA REPRESENTATION PROTOCOL FOR COMMUNICATIONS BETWEEN DIFFERENT NETWORKS

FIELD OF THE INVENTION

This invention relates to the interfacing of two different types of computers or computer networks and, more particularly, to providing an efficient data representation and protocol which formats information units that are communicated between two networks.

BACKGROUND OF THE INVENTION

In networking technology, it is known to use a "server" that functions as an interface between "clients" from different types of computers or networks. A server is a part hardware and a part software device designed to perform a specific function for multiple clients. The software that operates on a system such as a host computer of a network is referred to as a client. The multiple clients and the server all function in accordance with some predetermined protocol.

For example, when communicating information between networks, it is necessary to indicate the type of information such as user data or control information. This is often accomplished by appending a control/data indicator (C/D), e.g. a bit or set of bits, to the "actual" information itself. The entire piece of information including the actual information and the control/data indicator generally is termed an "information unit". Therefore, there can be control information units and data information units.

A problem is presented in how to effectively process the information units sent from one type of network to another type of network through a server. For example, a 9-bit information unit used in one network, having bits <7:0> (the actual information) and bit <8> (the C/D indicator), cannot be processed as a single information unit by an 8-bit (byte) oriented processor. Similarly, a network providing byte outputs and having a separate control/data indicator, cannot directly communicate with a network requiring a C/D indicator bit appended to the byte of information.

A known solution for the above example is to expand the 9-bit information unit to a 16-bit value which can then be processed by a byte oriented (8-bit) processor. This requires seven meaningless bits to be added to each 9-bit information unit which increases the memory space necessary in the server.

Further, the number of cpu cycles and consequently the time necessary to process the information units also increase. This is a result of having to independently, for each information unit received for processing, check whether the individual information unit contains control or data information. Therefore, the overall speed of the communication and efficiency of the processor is decreased.

There is thus a need for an efficient data representation for interfacing between different computers or computer networks.

SUMMARY OF THE INVENTION

The present invention provides a method of interfacing two networks by forming a plurality of information units into a "block", in accordance with the protocol of the instant invention, that is to be sent by one of the networks to the other network. The information units can be control information units or data information units.

Each block contains a header field that stores a total information unit count and a control information unit count. These counts indicate the number of information units in the block and the number of those information units which contain control information, respectively. The remainder of the block stores the "actual information" itself, both control and data, in consecutive byte locations, with the actual control information located at the end of the block as specified by the protocol.

A comparison of the values of the total information unit count and the control information unit count contained in the header field can indicate where the section of control information begins in each block. Further, because the block is formatted with the data information units "up front" in the block and the control information units at the "end" of the block, the size of a block varies depending upon the sequence of control or data information units received when forming the block.

In the instant invention, the server is described as being a part of one of the networks and coupled directly to the other network. The server, as described herein, performs the protocol translation of the present invention for the network to which it is connected. However, it is to be understood that the server could independently interface each network or the server could be a part of one network coupling with a server of the other network.

A block can be created by either a client (to be sent to the server that interfaces with another network) or by a server (after having received the information from the other network). When the information is received from the other network, the server converts the information into the block of the present invention. The information to be converted is preferably in the form of a fixed length block as described in copending application Ser. No. 07/438,036, filed on even date herewith, the disclosure of which is hereby incorporated by reference.

Once the block is forwarded from either the client to the server or the server to the client, the exact number of data and control information units can easily be determined by referencing the two count values in the block header.

When the server, acting as an interface for an 8-bit network, receives the block from a client, it can reconstruct the information units to the appropriate 9-bit format required by the other network by appending the correct C/D indicator bit, i.e. control or data information, as determined by the total information unit and control information unit counts in the block header.

Similarly, a server which constructs a block in accordance with the invention from information received from the other network, can send the block to the desired client for processing. The client need only reference the block header to determine whether the "actual information" in the block contains control or data information.

A further advantage of the present invention is that the blocks can be of variable size. They are only constrained by the protocol requiring that all control information units be at the end of the block. This speeds the processing of large quantities of either all data information and/or control information units.

BRIEF DESCRIPTION OF THE DRAWINGS

FIG. 1 is a block diagram of the environment of the present invention.

FIG. 2 is an example of the formats for m-bit and n-bit information unit of the present invention.

FIG. 3 shows the data representation for a block of the present invention.

FIG. 4 is an example of a completed block according to the invention.

DETAILED DESCRIPTION

FIG. 1 illustrates one example of a system 28 making use of the present invention. The system 28 includes a server 10 that interfaces two computer networks 12 and 14.

Network 12 is coupled to the server 10 through a bus 16 such as an Ethernet bus. Network 14 is shown coupled to the server 10 through serial line 22, for example, an optical fiber. The server is provided with server memory 21. Circuit switch 30 located in network 14 receives information from the server 10 via the fiber 22. The circuit switch 30 then couples the information, depending upon a selected channel number, to any of a number of devices (not shown) in the network 14. For purposes of this description, assume that the protocol for network 14 requires that information be received in m-bit information units wherein bits $<m-1:0>$ contain the actual information and bit $<m>$ contains the C/D indicator.

Network 12 includes a plurality of devices 18, 20, coupled to the bus 16. These devices 18, 20 may be any type of intelligent device such as a host processor or intelligent peripheral. For example, the devices 18, 20 in network 12 can be n-bit or byte (n=8) oriented processors that operate on n-bit information units. The software which operates on the devices 18, 20 is conceptually illustrated by blocks 24 and 26. These software blocks 24 and 26 are referred to as "clients" which interact with the server 10 in accordance with the protocol of the instant invention.

The protocol established for transferring information between the clients 24, 26 and the server 10 allows for the efficient communication of the information between n-bit oriented devices 18, 20 of network 12 (which provide n-bit information units) and the network 14, which can only receive information in m-bit information units. The information is passed between the devices 18, 20 and the server 10 (through the clients 24, 26) as a set of information units referred to as a "block" in the protocol. The block efficiently represents the information units to be communicated from one network 12, 14 to another.

FIG. 2 shows the format for the m-bit and n-bit information units processed by the respective networks 14 and 12. As discussed above, the m-bit information unit uses the $m^{th}$ bit to indicate whether the lower ordered bits, $<(m-1):0>$ represent control or data information for that particular information unit. The n-bit information unit does not contain a C/D bit. With an n-bit information unit, the protocol of the present invention is defined such that all control information units occur at the end of a block. When a client in the n-bit network forms a block, it knows, by any conventional manner, whether each n-bit information unit is a control or data information unit, thereby avoiding the use of a C/D bit.

Referring to FIG. 3, there is shown an embodiment of a block 50 wherein the block 50 is arranged as a set of 32-bit longwords. A block header field is located in the first address 01 of the block 50. The header field contains a number of fields including a channel number field 71, control information unit count field 72 and a total information unit count field 70. Other control functions can also be implemented in the header field, e.g., a field to distinguish between different types of blocks, i.e., those containing commands and responses as opposed to representing information; a field indicating whether the information in the block 50 is continued in successive blocks, etc.

In one embodiment of the header field shown in FIG. 3, bits $<10:0>$ indicate the channel number associated with the information; bits $<12:11>$ are reserved for other various control functions as discussed above; bits $<15:13>$ are the count of the number of control information units in the block 50; $<31:16>$ maintain the total count of all of the information units contained in the block 50.

The block addresses 02 through 257 (decimal), following the header address 01, contain the actual information to be transferred. Because the protocol between the clients 24, 26 and server 10 requires all control information units to be at the end of the block (i.e. an 8-bit system), there is no need to have separate C/D indicators as part of each information unit to indicate control or data.

The block 50 is constructed in either a device memory 19 or the server memory 21 by the client 24, 26 or the server 10, respectively, depending upon the direction of information transfer, i.e., from network 12 to 14 or 14 to 12. Each block begins at a given address in either the device or server memory. Once a block is completed, the information in the block addresses can then be forwarded across the bus 16. For information being sent to the network 14, each byte of information in the block (constructed by the client in the device memory and sent to the server) is appended with a C/D indicator by the server hardware as appropriately determined by a comparison of the count in the block header.

One example of the construction of a block 50 by a client 24 for transmission to network 14 is shown in FIG. 4, wherein each n-bit information unit is assembled into the block 50. The block 50 is represented by address locations, 01-04, in which the information units are written prior to transmission. The header fields having the total information unit count field 70 and control information unit count field 72 indicates the number of data information units and control information units assembled in the block 50.

In this example, seven data information units, D1-D7, are loaded by a client, e.g., client 26; into address locations 02 and 03 of the device memory 19. As required by the protocol, the control information units C1-C3 immediately follow the data units D1-D7. Thus, when assembling the block 50, the total information unit count increments from 0 to 7 for the data units D1-D7 and then continues with the control units C1-C3. The total information unit count field 70 therefore stores a value of ten. Similarly, control information unit count field 72, increments for each control information unit C1-C3 received in the block 50. The control information unit count for this example therefore stores a value of three.

Because the protocol requires that all control information units must be located at the end of a block, the loading of another data information unit, D8 (not shown), would terminate construction of the previous block and begin the construction of a new block. It is apparent that the most inefficient use of the blocks occurs where an alternating sequence of data and control units are transmitted. In this case, a new block would be generated every two information units. More often, however, the two types of information, i.e., control or data, are communicated in contiguous groups. The block representation allows effective grouping of the information units and provides a substantial savings in memory space located in the devices 18, 20 and the server 10. Further, the block allows efficient use of the network 12 resources.

After assembly, the completed block 50 is then sent to the server 10 via bus 16. The server 10 then reconstructs m-bit information units to be sent over serial line 22 to the computer network 14. This is accomplished by making reference to the header information. The counts 70, 72 in the header field determine whether information units are data or control information as described below.

In this example, by comparing the total information unit count 70 and control information unit count 72, the hardware (or software) of the server 10 determines that the first seven information units (D1–D7) in the block 50 are data information units and the last three information units are control information units (C1–C3, e.g., (10 total)−(3 control)=(7 data). In this manner, the correct $m^{th}$ bit (the C/D bit) can be appended to the information units D1–D7 and C1–C3 before they are forwarded to the m-bit protocol computer network 14, e.g., $m^{th}$ bit=1 for control information or $m^{th}$ bit=0 for data information.

In the illustrated example, the server 10 knows that information units D1–D4 located in address 02 are all data information units and thus a 0 will be appended as each of their $m^{th}$ bits. As each bit is appended, the total information unit count 70 is decremented. Data information units D5–D7 located at address 03, i.e., in the first 24 bits <23:0>, will each be appended with a 0. At this point, the total information unit count 70 equals the value of the control information unit count 72, thereby signalling that the remaining information units C1–C3 are all control information units. Therefore, bits <31:24> of address 03 represent control information and will be appended with an $m^{th}$ bit equaling 1. Similarly, each control information unit C2–C3 located at address 04 will also be appended with a one. Once the control information unit count 72 decrements to zero, the transmission of the block 50 is completed. The use of the counts 70, 72 in the header 52 provides an indication of the boundary between the data information and the control information in the block. The counts 70, 72 allow the appending of the correct $m^{th}$ bit to the (m−1) bits of the information units.

Similarly for the transmission of information from network 14 to network 12, the information units are sent in a serial format to the server 10 over line 22. The server 10 receives the information units and places them in the server memory 21. The server then converts the received information units into the block of the present invention. In the preferred embodiment, the information in the server memory 21 to be converted is in the form of a fixed length block, the formation of which is described in copending application Ser. No. 07/438,036 incorporated by reference above.

Once the variable size block is formatted, the server sends the block over the bus 16 to the intended device 18, 20 which can then process the information contained therein.

What is claimed is:

1. A method of transmitting data and control information between two networks that use different data representation formats, the method comprising the steps of:
    A) generating information units in one of the networks that includes control information units and data information units;
    B) forming the information units into a block in the order in which said information units are generated;
    C) determining for each information unit generated whether said each information unit is a control information unit or a data information unit;
    D) ending forming the block at a control information unit when a block sequence has a control information unit followed by a data information unit; and
    E) sending the block to the other of said networks.

2. The method according to claim 1 further comprising the step of:
    F) repeating steps A), B), C), D), and E) for all information units to be transmitted.

3. The method according to claim 2 wherein the step of forming the information units further comprises the steps of:
    1) forming a header field for said block; and
    2) accounting in the header field for a total number of each type of information unit contained in the block.

4. The method according to claim 3 wherein the step of accounting further comprises the steps of:
    a) storing a count of a total number of information units in the block; and
    b) storing a count of a total number of control information units in the block.

5. The method according to claim 4 further comprising the steps of:
    G) receiving the block in the other of said networks;
    H) comparing, in the other of said networks, the count of the total number of information units with the count of the total number of control information units to determine a total number of data information units in the block.

6. The method according to claim 3 wherein the one network is an n-bit network and the other network is an m-bit network, m being equal to n+1, said information units forming the block each having n-bits, further comprising the steps of:
    G) receiving the block in the m-bit network;
    H) checking the header field to determine, in the order in which said information units are generated, whether each information unit is a data information unit or a control information unit;
    I) appending an $m^{th}$ bit, having a first value, to said n-bit information units that are data information units;
    J) appending an $m^{th}$ bit, having a second value, to said n-bit information units that are control information units; and
    K) providing a serial stream of the appended information units for the m-bit network.

7. In a system including a plurality of clients of one network, with a first network using a first data representation format, coupled to a server which communicates with second network, the second network using a second data representation format, a method of transmitting data and control information between the first network and the second network, the method comprising the steps of:
- A) generating information units from the first network that includes control information units and data information units;
- B) forming the information units into a block in the order in which said information units are generated;
- C) determining for each information unit generated whether each information unit is a control information unit or a data information unit;
- D) ending formation of a block with a control information unit when a block sequence has a control information unit followed by a data information unit; and
- E) sending the block to the second networks.

8. The method according to claim 7 wherein the step of forming the information units is carried out in the server.

9. The method according to claim 7 wherein the step of forming the information units is carried out in one of the plurality of clients.

10. The method according to claim 7 wherein one of said two networks is a single computer device.

11. A computer system, comprising:
- an m-bit network;
- an n-bit network including at least one device;
- a server coupling the m-bit network to the n-bit network, with the server further including:
- a memory;
- means in the memory for receiving and storing information units from the m-bit network, said information units including control information units and data information units;
- means for forming the information units into a block in the order in which said information units are received in the memory;
- means for determining whether each information unit received is a control information unit or a data information unit;
- means for ending the formation of said block with a control information unit when a sequence of a control information unit followed by a data unit is detected; and
- means for ending the block to the n-bit network.

12. The system according to claim 11 wherein the means for forming the information units comprises means for forming a header field for said block.

13. A system according to claim 12 further comprising:
- means for receiving the block in the n-bit network;
- first means for counting a total number of information units in the block;
- second means for counting a total number of control information units in the block; and
- means for comparing the total number of information units with the total number of control information units to determine a total number of data information units in the block.

14. The system according to claim 13 wherein one of said m-bit or n-bit networks is a single computer.

15. A server for interfacing between an m-bit network and an n-bit network, comprising:
- a memory;
- means in the memory for receiving and storing information units from the m-bit network, said information units including control information units and data information units;
- means for forming the information units into a block in the order in which the information units are received in the memory;
- means for determining whether each information unit received is a control information unit or a data information unit;
- means for determining a sequence of a control information unit followed by a data information unit; and
- means for ending the formation of said block with said preceding control information unit.

16. The server according to claim 15 wherein the means for forming the information units comprises means for forming a header field for said block.

* * * * *